United States Patent
Yonekura (10) Patent No.: US 8,634,165 B2
(45) Date of Patent: Jan. 21, 2014

(54) LOAD BEAM WITH LOAD BENDS GENERATING LOAD, HEAD SUSPENSION WITH THE LOAD BEAM, AND METHOD OF FORMING LOAD BENDS OF THE LOAD BEAM

(75) Inventor: Ryosuke Yonekura, Aikoh-gun (JP)

(73) Assignee: NHK Spring Co., Ltd., Kanagawa (JP)

( * ) Notice: Subject to any disclaimer, the term of this patent is extended or adjusted under 35 U.S.C. 154(b) by 0 days.

(21) Appl. No.: 13/599,354

(22) Filed: Aug. 30, 2012

(65) Prior Publication Data

US 2013/0057985 A1    Mar. 7, 2013

(30) Foreign Application Priority Data

Sep. 6, 2011    (JP) .................. 2011-194353

(51) Int. Cl.
  *G11B 5/48*    (2006.01)
(52) U.S. Cl.
  USPC ....................................... 360/244.8

(58) Field of Classification Search
  USPC ............... 360/244.2, 244.8, 244.9, 265.9
  See application file for complete search history.

(56) References Cited

U.S. PATENT DOCUMENTS

| 5,471,734 | A | 12/1995 | Hatch et al. | |
| 7,113,371 | B1* | 9/2006 | Hanna et al. | 360/244.8 |
| 7,787,217 | B2* | 8/2010 | Mangold et al. | 360/244.8 |
| 8,233,244 | B2* | 7/2012 | Fujimoto | 360/294.4 |
| 8,441,760 | B2* | 5/2013 | Fujimoto | 360/244.8 |
| 8,446,697 | B2* | 5/2013 | Fujimoto et al. | 360/265.9 |
| 8,520,340 | B2* | 8/2013 | Fujimoto | 360/244.2 |

* cited by examiner

*Primary Examiner* — Angel Castro
(74) *Attorney, Agent, or Firm* — Jordan and Hamburg LLP (57) ABSTRACT

A load beam of a head suspension has a rigid part and a resilient part supported with a base to be attached to a carriage arm. The load beam applies a load onto a head supported at a front end of the rigid part. The load beam includes a load bend formed in each of a pair of legs that extend from widthwise sides of a base end of the rigid part and form the resilient part. The load bend is formed by bending the leg along a bend line that is defined on the leg and extends in a width direction of the load beam. The bend lines on the legs are positionally shifted from each other in a length direction of the load beam.

8 Claims, 12 Drawing Sheets

LOAD BEAM WITH LOAD BENDS GENERATING LOAD, HEAD SUSPENSION WITH THE LOAD BEAM, AND METHOD OF FORMING LOAD BENDS OF THE LOAD BEAM

BACKGROUND OF THE INVENTION

1. Field of the Invention

The present invention relates to a load beam for applying load onto a head, a head suspension having the load beam and supporting the head, and a method of forming a load bend in the load beam.

2. Description of Related Art

An example of the head suspension for a hard disk drive is disclosed in U.S. Pat. No. 5,471,734. This head suspension includes a base attached to an arm of a carriage and a load beam supported with the base.

The load beam includes a rigid part and a resilient part. The resilient part is connected to the base so that the load beam is supported with the base like a cantilever. A front end of the rigid part supports a head and the resilient part applies load onto the head. The resilient part includes a load bend and a bend quantity of the load bend determines the load applied to the head.

When a disk is turned at high speed in the hard disk drive, the head of the head suspension slightly flies above the disk against the load applied thereto by the load beam and writes and reads data to and from the disk.

A flying height of the head is dependent on the load applied thereto by the load beam. This load is called as "suspension preload" or "gram load". An increasing need for high-density magnetic disks requires the gram load to be severely managed.

The gram load has a linear correlation to a bend quantity of the load bend formed in the resilient part of the load beam. This is because the load beam is supported with the base like a cantilever. Controlling the gram load is carried out by strictly controlling the bend quantity of the load bend.

The load bend is generally formed with metal molds to attain target gram load value, and thereafter, the load bend is irradiated with laser beams to precisely adjust the gram load to the target value.

To provide the load beam of the head suspension with precision gram load, the bend quantity must strictly be managed from during the load bend forming process that uses metal molds.

Namely, the metal molds must closely be managed so as to be accurate. This, however, increases the number of metal mold maintenance processes and elongates a manufacturing line suspension time due to the maintenance processes.

SUMMARY OF THE INVENTION

An object of the present invention is to provide a load beam having load bends in a resilient part that easily realizes a target load value. Another object of the present invention is to provide a head suspension having such a load beam. Still another object of the present invention is to provide a method of forming load bends in a resilient part of a load beam.

In order to accomplish the objects, a first aspect of the present invention provides a load beam for a head suspension, the load beam including a rigid part supporting a head at a front end thereof and a resilient part through which the rigid part is supported with a base to be attached to a carriage arm, to apply a load onto the head. The resilient part includes a pair of legs that extend from widthwise sides of a base end of the rigid part and load bends formed in the pair of legs, respectively. Each load bend is formed by bending a corresponding one of the legs along a bend line that is defined on the corresponding one of the legs and extends in a width direction of the load beam. The bend lines on the legs are positionally shifted from each other in a length direction of the load beam.

A second aspect of the present invention provides a method of forming the load bends of the load beam. The method includes steps of setting the resilient part of the load beam having a pair of unbent legs of the resilient part on a die having a pair of linear edges, bringing the pair of linear edges in contact with the pair of unbent legs so that the pair of linear edges widthwise cross the pair of unbent legs at locations that are shifted from each other in the length direction of the load beam, and bending the pair of unbent legs along the pair of edges of the die toward the die, thereby forming the load bends.

These aspects of the present invention easily realizes a target load value without strictly controlling the bend quantity of each load bend.

DETAILED DESCRIPTION OF EMBODIMENTS

Embodiments of the present invention will be explained. In the embodiments, the load beam has a resilient part that easily realizes a target load value. The resilient part is provided with load bends that are formed along bend lines that are positionally shifted from each other in a longitudinal direction of the load beam.

A first embodiment will be explained in detail with reference to the drawings.

Figure 1:
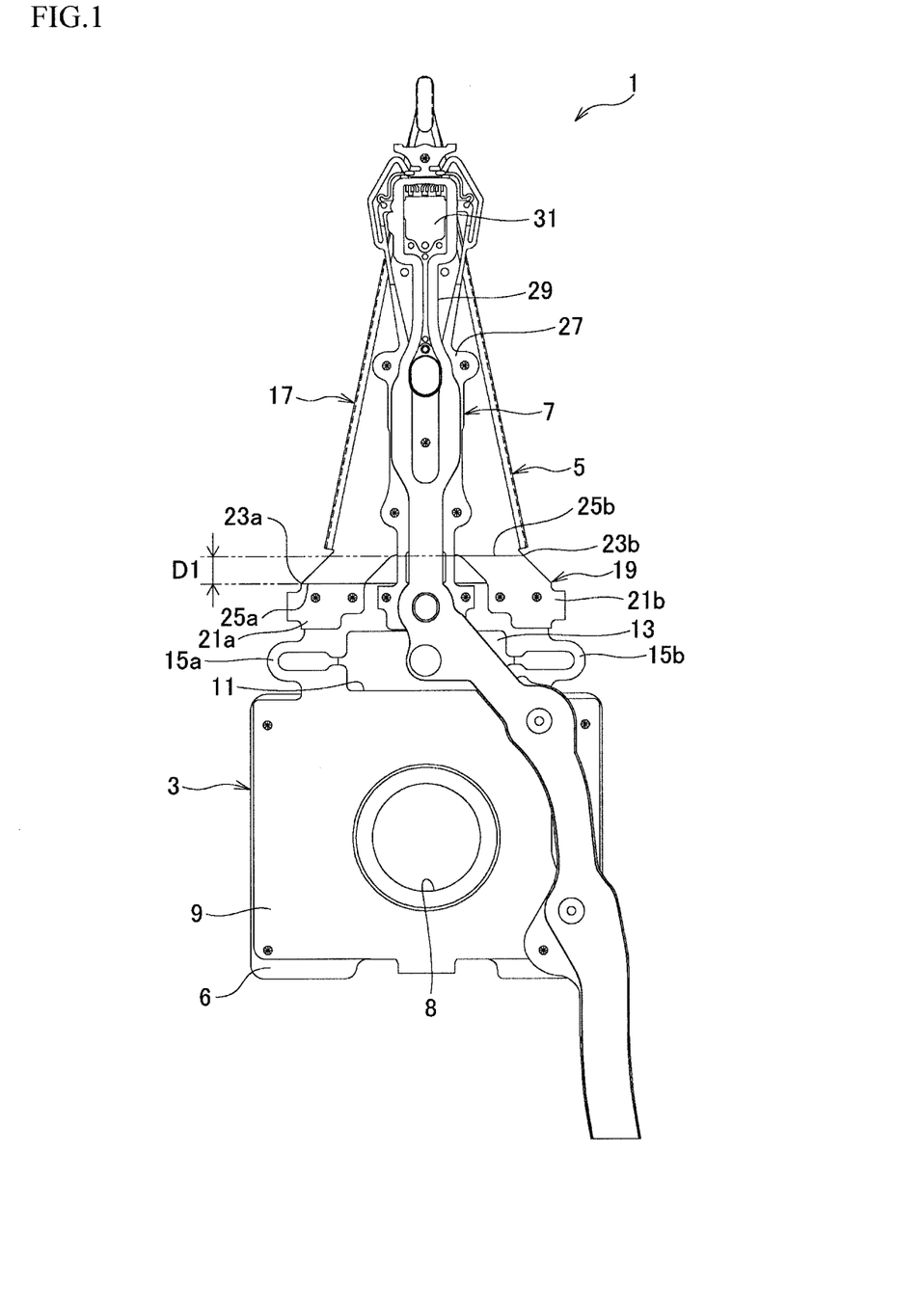
FIG. 1 is a plan view illustrating a head suspension according to a first embodiment of the present invention.

FIG. 1 is a plan view illustrating a head suspension having a load beam according to the first embodiment of the present invention.

The head suspension 1 has a base 3, the load beam 5, and a flexure 7.

The base 3 has a base plate 6 made of conductive material such as stainless steel. The base plate 6 integrally has a boss 8 with which the base 3 is attached to an arm of a carriage (not illustrated). With the carriage, the head suspension 1 is turned with respect to a disk of a hard disk drive. The base plate 6 is laid on a base end part of a reinforcing plate 9 and is joined thereto by, for example, laser welding. A front end part of the reinforcing plate 9 has an opening 11 in which a piezoelectric element 13 is attached. On each side of the opening 11, there are U-shaped flexible parts 15a and 15b. A front end of the reinforcing plate 9 is connected to the load beam 5.

The load beam 5 applies a load that is a gram load (suspension preload) onto a head (not illustrated). The head is used to write and read data to and from the disk of the hard disk drive. The load beam 5 has a rigid part 17 and a resilient part 19. The rigid part 17 is made of, for example, a stainless steel plate having a thickness of, for example, about 30 μm.

A front end of the rigid part 17 supports the head and a base end of the rigid part 17 is integral with the resilient part 19. The resilient part 19 may be a discrete part that is joined to the rigid part 17 by, for example, laser welding.

The resilient part 19 has legs 21a and 21b and load bends 23a and 23b. The legs 21a and 21b are plates and extend from widthwise sides of the base end of the rigid part 17 up to the base plate 6. Ends of the legs 21a and 21b are laid on the front end of the reinforcing plate 9 and are fixed thereto by, for example, laser welding.

The load beam 5 is supported with the base 3 through the resilient part 19, to apply the gram load onto the head arranged at the front end of the rigid part 17.

The load bends 23a and 23b that generate the gram load are permanently bent along bend lines 25a and 25b. The bend lines 25a and 25b are defined on the legs 21a and 21b and extend in a lateral or width direction of the load beam 5. The bend lines 25a and 25b are positionally shifted from each other in a longitudinal or length direction of the load beam 5.

According to the first embodiment, the bend line 25a is behind the bend line 25b, i.e., the bend line 25b is in front of the bend line 25a in FIG. 1 in which the front side corresponds to the top side of the drawing. This positional relationship of the bend lines 25a and 25b is reversible.

A positional difference D1 between the bend lines 25a and 25b is determined according to a target gram load value (target suspension preload value) required for the load beam 5.

The flexure 7 has a metal base plate 27 and a wiring pattern 29. The flexure 7 extends from the front end of the load beam 5 toward the base 3 and is fixed to the rigid part 17 and base 3 at proper spots by, for example, laser welding.

A front end of the flexure 7 has a cantilever tongue 31 to which the head is attached. The head is supported with the rigid part 17 of the load beam 5 through the tongue 31 at the front end of the rigid part 17. The head is connected to a first end of the wiring pattern 29 of the flexure 7. A second end of the wiring pattern 29 is connected to an external terminal outside the base 3. An intermediate part of the wiring pattern 29 is connected to the piezoelectric element 13.

According to the first embodiment, the bend lines 25a and 25b of the load bends 23a and 23b formed in the resilient part 19 are positionally shifted from each other in the length direction of the load beam 5, and therefore, a target gram load value is easily realizable without strictly managing the bend quantities of the load bends 23a and 23b.

When the load bends 23a and 23b are formed along the bend lines 25a and 25b to have predetermined bend quantities or over according to the size of the positional difference D1 between the bend lines 25a and 25b, the gram load substantially maintains a constant value. This will be explained later in detail.

The first embodiment sets a target gram load value in the constant value according to the positional difference D1 and forms the load bends 23a and 23b of the resilient part 19 to have predetermined bend quantities or over, thereby easily realizing the target gram load value desired for the head suspension 1.

A method of forming the load bends 23a and 23b in the resilient part 19 of the head suspension 1 according to the first embodiment will be explained.

Figure 2:
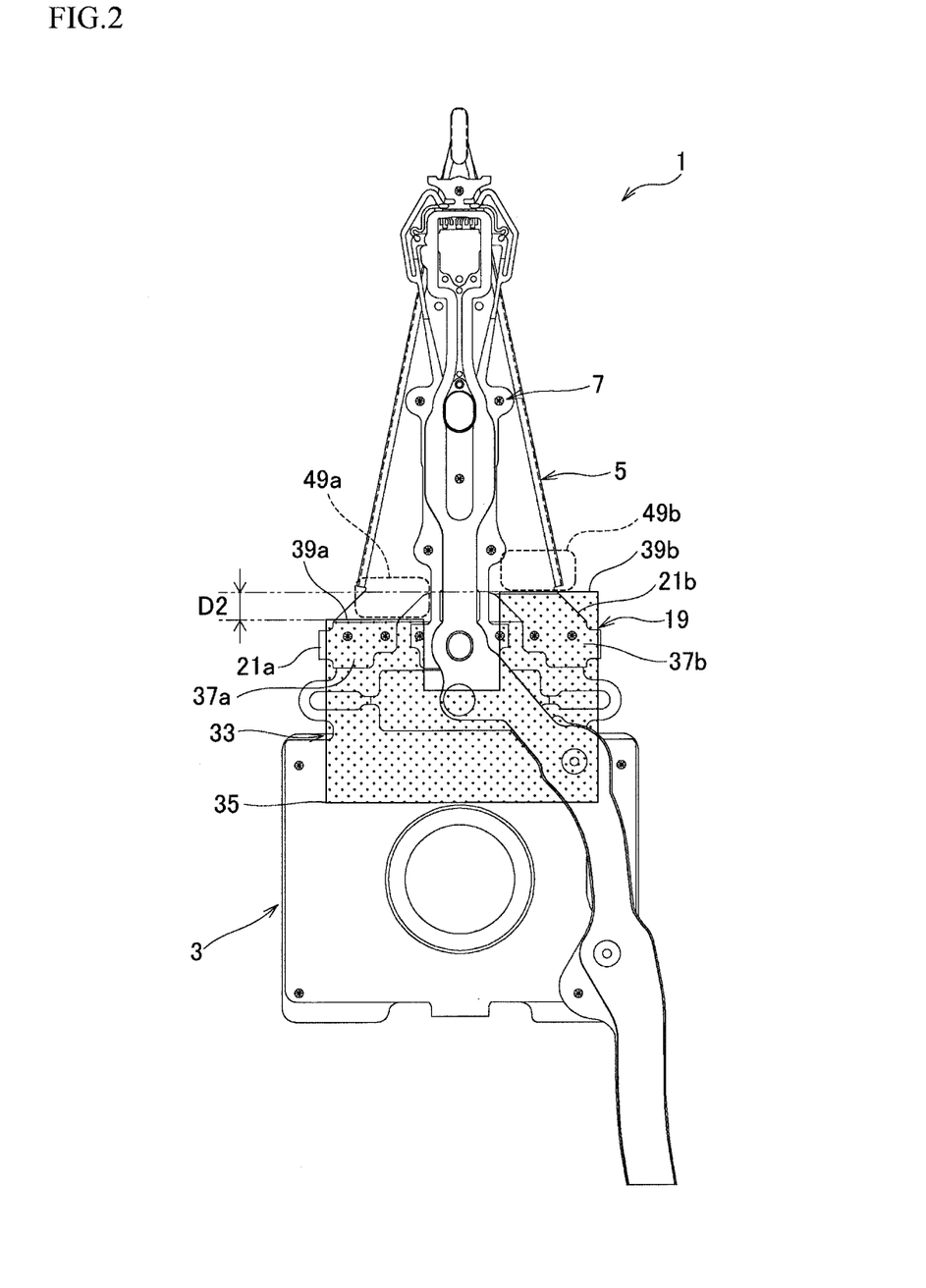
FIG. 2 is a plan view illustrating a method of forming load bends in a resilient part of a load beam of the head suspension according to the first embodiment.
Figure 3A:
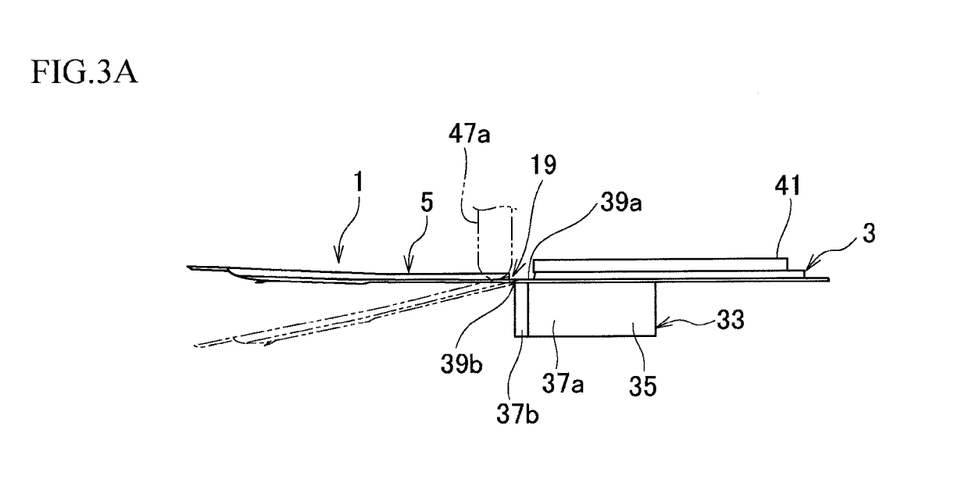
FIGS. 3A and 3B are side views partly illustrating opposite sides of the load beam of FIG. 2 in which the load bends are formed.
Figure 3B:
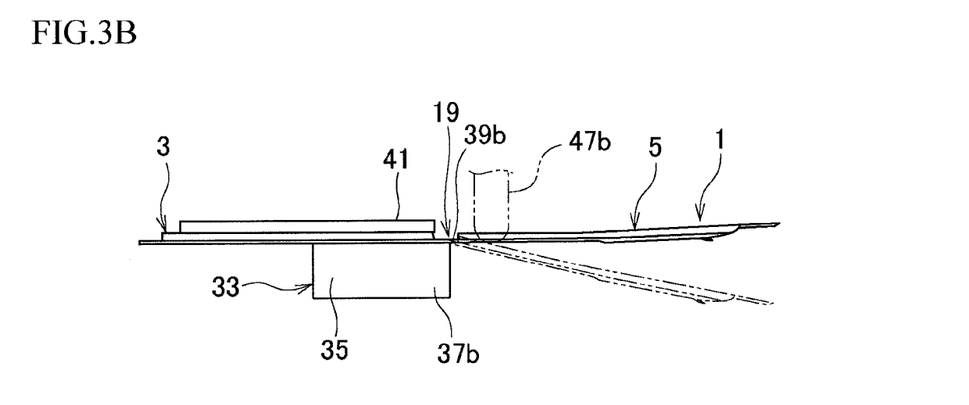
Figure 4:
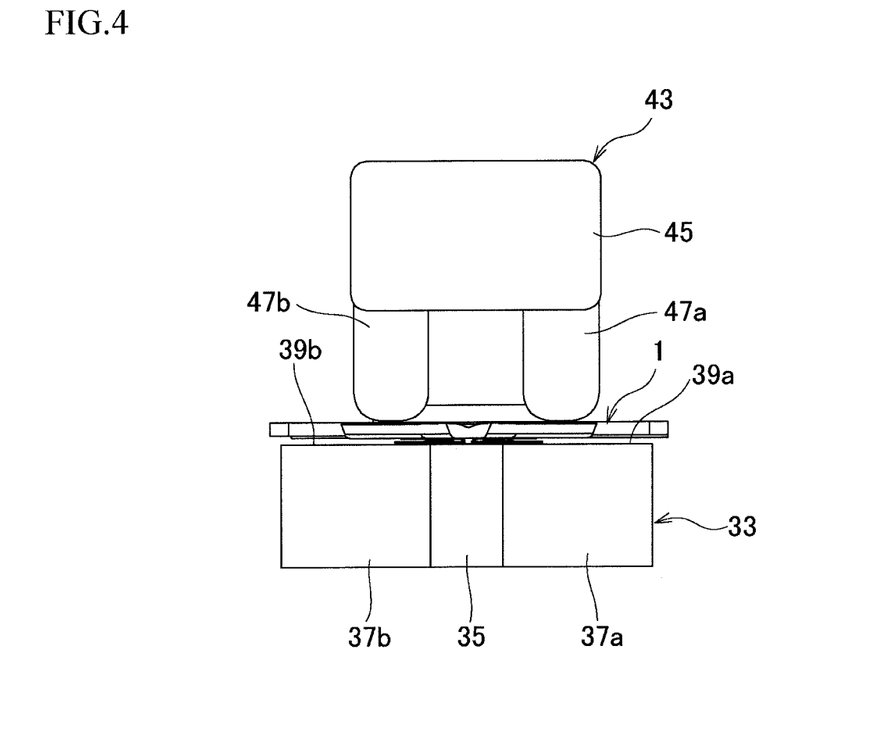
FIG. 4 is a front view illustrating a punch and die to form the load bends in the load beam of FIG. 2.
Figure 5A:
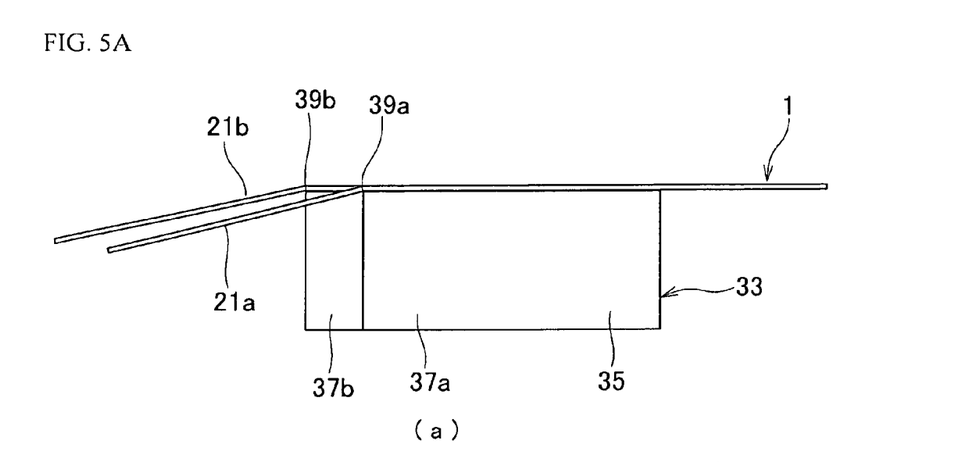
FIG. 5A is an enlarged side view mainly illustrating the resilient part of the load beam and a die to form the load bends in FIG. 3A.

FIG. 2 is a plan view illustrating the load bend forming method, FIGS. 3A and 3B are side views illustrating opposite sides of a part of the load beam 5 where the load bends 23a and 23b are formed, FIG. 4 is a front view illustrating a die 33 and punch 43 to form the load bends 23a and 23b in the load beam 5, and FIG. 5A is an enlarged side view illustrating the load beam 5 and die 33.

First, a portion extending from the resilient part 19 of the load beam 5 to the base 3 are set on the die 33. At this time, the resilient part 19 has unbent legs 21a and 21b. The die 33 has a die body 35 and extensions 37a and 37b that extend from both sides of the die body 35 in the length direction of the load beam 5. The extensions 37a and 37b are positioned under unbent legs 21a and 21b of the resilient part 19.

The extensions 37a and 37b of the die 33 have different lengths and are provided with linear edges 39a and 39b, respectively. The edges 39a and 39b are positionally shifted from each other in the length direction of the load beam 5 and widthwise come in contact with the unbent legs 21a and 21b of the resilient part 19, respectively.

Then, an upper pad 41 is set on the base 3 to hold the base 3 between the upper pad 41 and the die 33 as illustrated in FIGS. 3A and 3B.

Then, a punch 43 is lowered to form the load bends 23a and 23b in the unbent legs 21a and 21b of the resilient part 19 as illustrated in FIG. 4. The punch 43 has a punch body 45 and pressers 47a and 47b downwardly extending from the punch body 45 and having the same length. The pressers 47a and 47b are simultaneously moved to press adjacent portions 49a and 49b of the load beam 5 adjacent to portions of the load beam 5 corresponding to the edges 39a and 39b of the die 33 toward the die 33.

As a result, the legs 21a and 21b of the resilient part 19 are permanently bent along the edges 39a and 39b of the extensions 37a and 37b as illustrated in FIG. 5A and the load bends 23a and 23b are formed as illustrated in FIG. 1. According to the first embodiment, the edges 39a and 39b of the die 33 define the bend lines 25a and 25b of the load bends 23a and 23b and a positional difference D2 between the edges 39a and 39b determines the positional difference D1 between the bend lines 25a and 25b.

Figure 5B:
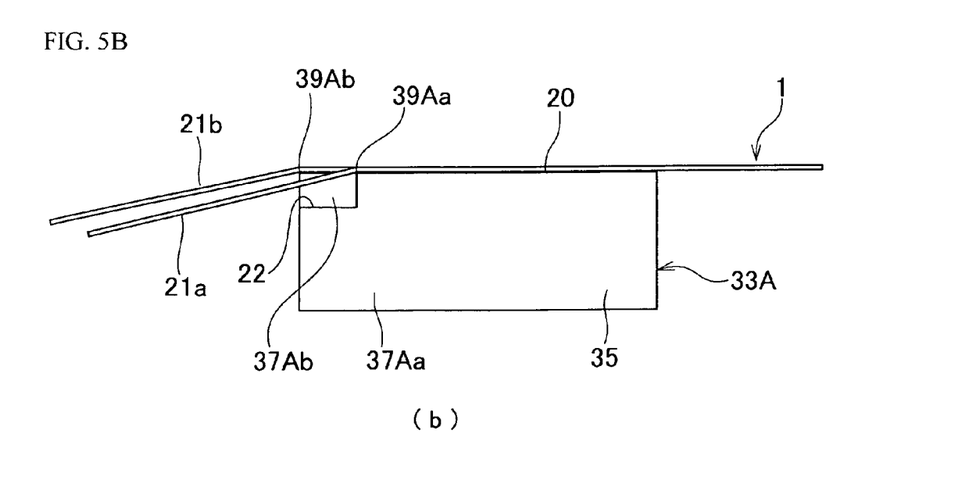
FIG. 5B is an enlarged side view mainly illustrating the resilient part of the load beam and a die that is a modification of the die of FIG. 5A to form the load bends.

The die 33 of FIG. 5A may be modified into a die 33A of FIG. 5B. FIG. 5B is an enlarged side view illustrating the resilient part and a die that is a modification of the die of FIG. 5A. The die 33A has extensions 37Aa and 37Ab having the same length. The extension 37Aa is provided with a recess 22 formed in a setting surface 20 on which the resilient part 19 of the load beam 5 is set.

With the recess 22, an edge 39Aa of the extension 37Aa is positionally rearward shifted from an edge 39Ab of the extension 37Ab in the length direction of the load beam 5 set on the die 33A.

Accordingly, the surface 20 has the edges 39Aa and 39Ab that are positionally shifted from each other in the length direction of the load beam 5 due to the recess 22. With the positionally shifted edges 39Aa and 39Ab, the modified die 33A is capable of forming the load bends 23a and 23b according to the first embodiment.

Figure 6:
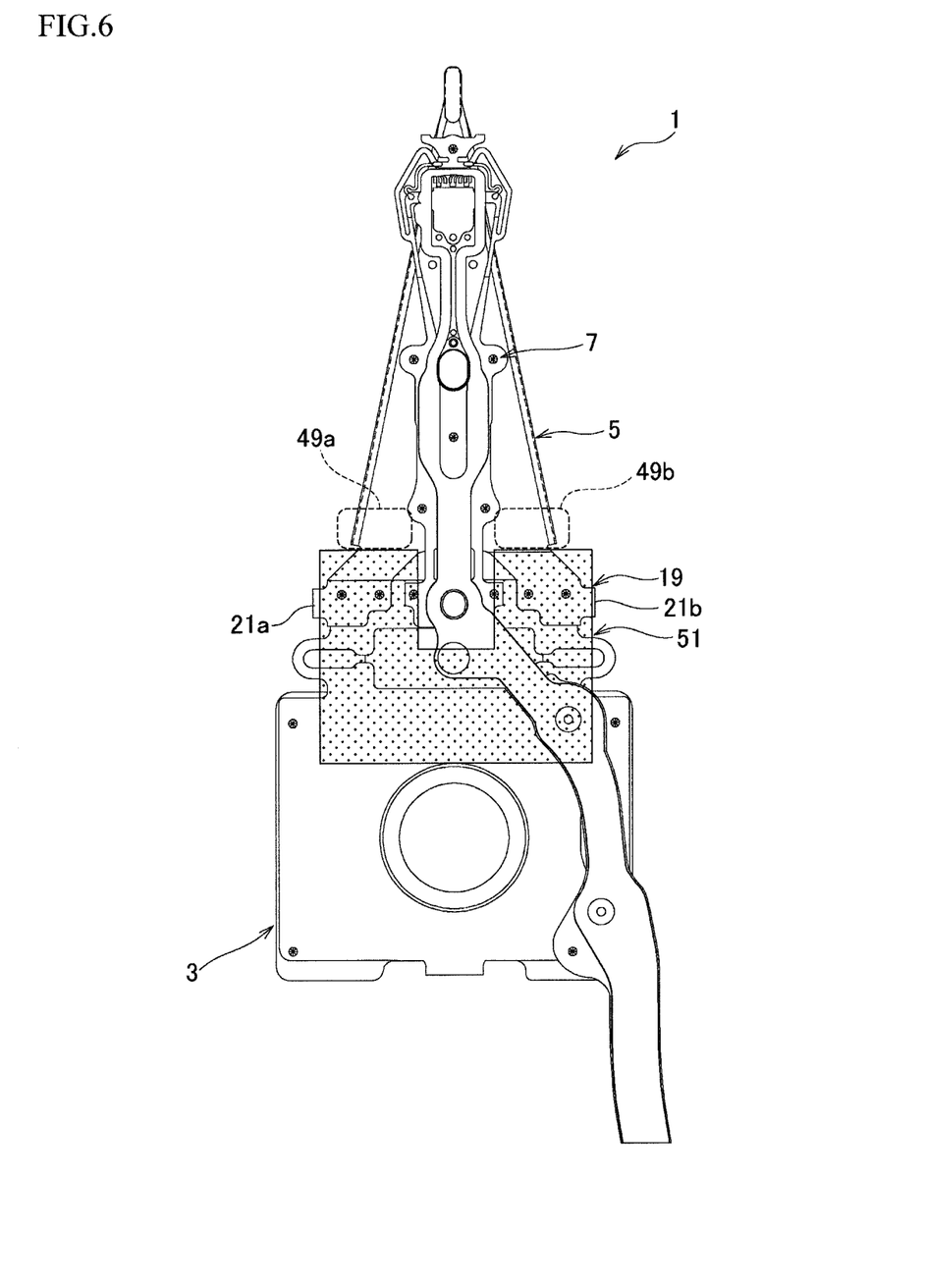
FIG. 6 is a plan view illustrating a method of forming load bends in a resilient part of a load beam according to an alternative embodiment.
Figure 7A:
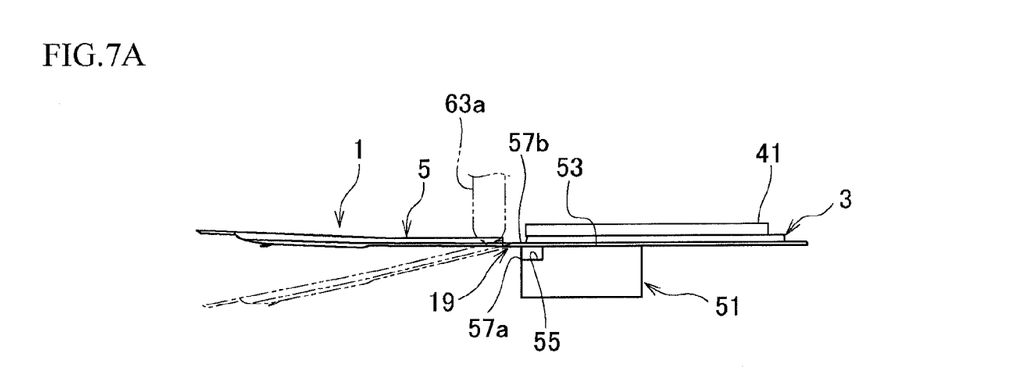
FIGS. 7A and 7B are side views partly illustrating opposite sides of the load beam of FIG. 6 in which the load bends are formed.
Figure 7B:
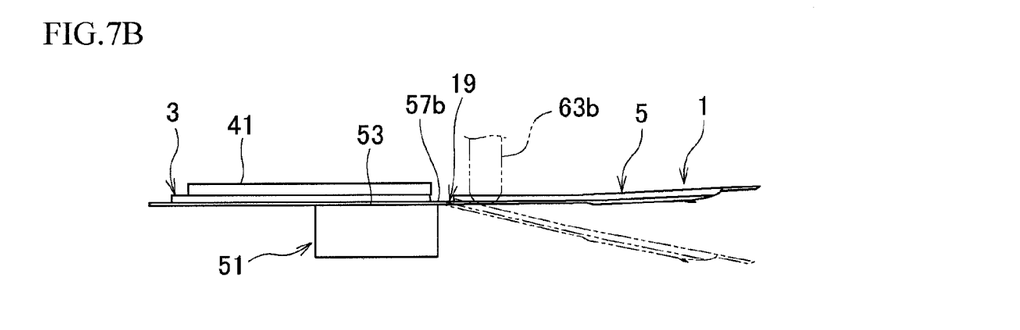
Figure 8:
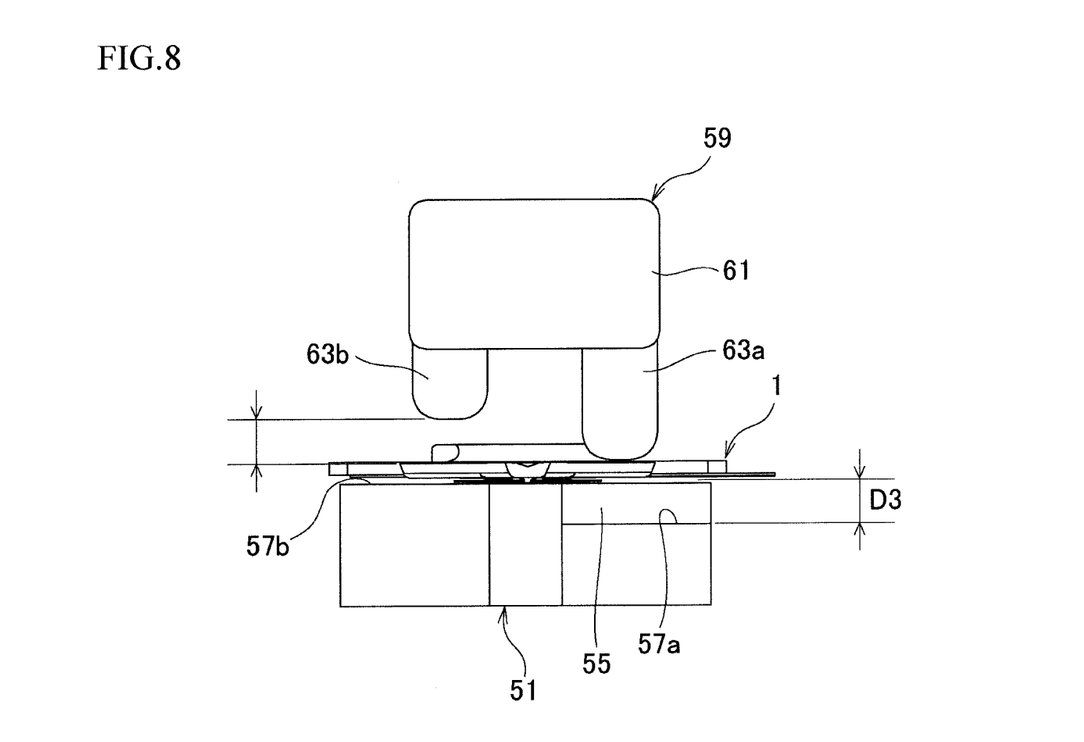
FIG. 8 is a front view illustrating a punch and die to form the load bends in the load beam of FIG. 6.
Figure 9:
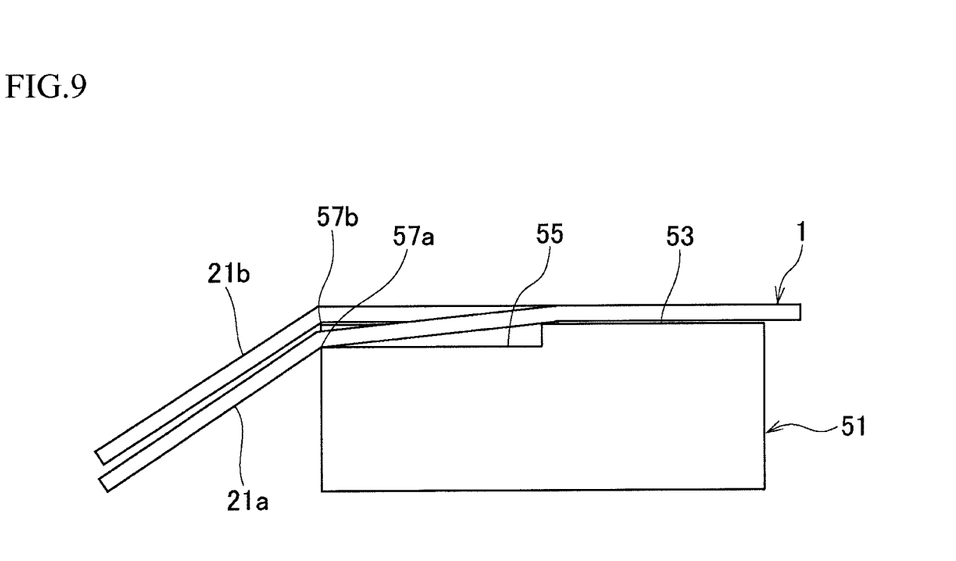
FIG. 9 is an enlarged side view mainly illustrating the resilient part of the load beam and the die to form the load bends in FIG. 7A.

An alternative embodiment will be explained with reference to FIGS. 6 to 9 in which FIG. 6 is a plan view illustrating a method of forming load bends in a resilient part of a load beam of a head suspension, FIGS. 7A and 7B are side views illustrating both sides of the load beam of FIG. 6 in which the load bends are formed, FIG. 8 is a front view illustrating a punch and die to form the load bends in the load beam of FIG. 6, and FIG. 9 is an enlarged side view mainly illustrating the resilient part of the load beam and the die to form the load bends.

As illustrated in FIGS. 6 to 9, the resilient part 19 of the load beam 5 of the head suspension 1 is set on a surface 53 of the die 51. The surface 53 of the die 51 has a recess 55. Accordingly, the surface 53 has a linear surface edge 57b and the recess 55 has a linear recess edge 57a. The edges 57a and 57b are shifted from each other in a vertical direction or bending direction of load bends 23a and 23b.

The edges 57a and 57b extend under unbent legs 21a and 21b of the resilient part 19 in a width direction of the load beam 5.

As illustrated in FIGS. 7A and 7B, an upper pad 41 is lowered to hold a base 3 of the head suspension 1 between the upper pad 41 and the surface 53 of the die 51.

As illustrated in FIG. 8, a punch 59 is lowered to form load bends 23a and 23b in the legs 21a and 21b of the resilient part 19. The punch 59 has a punch body 61 and pressers 63a and 63b that downwardly extend and have different lengths. The pressers 63a and 63b simultaneously move to press adjacent portions 49a and 49b of the load beam 5 adjacent to portions of the load beam 5 corresponding to the edges 57a and 57b of the die 51 toward the die 51.

The presser 63b of the punch 59 corresponding to the surface edge 57b of the die 51 is shorter than the presser 63a of the punch 59 corresponding to the recess edge 57a of the die 51. According to the embodiment, the presser 63a is longer than the presser 63b by a depth D3 of the recess 55. Accordingly, the adjacent portion 49a adjacent to the recess edge 57a is first pressed by the presser 63a to elastically deform the unbent leg 21a into the recess 55 as illustrated in FIG. 9.

As the elastic deformation of the leg 21a progresses, the unbent leg 21a comes in contact with the recess edge 57a of the die 51. At this time, the presser 63b of the punch 59 comes in contact with and starts to press the unbent leg 21b of the resilient part 19. Namely, the adjacent portion 49b is pressed after the elastic deformation of the leg 21a. The contact between the leg 21a and the recess edge 57a and the contact between the presser 63b and the leg 21h may not simultaneously be carried out. They may be carried out with a time difference.

With or without such a time difference, the alternative embodiment is achievable if the pressers 63a and 63h of the punch 61 can press the adjacent portions 49a and 49b of the load beam 5 toward the die 51 when the legs 21a and 21b of the resilient part 19 of the load beam 5 come in contact with the edges 57a and 57b of the die 51 according to a relationship between the depth D3 of the recess 55 of the die 51 and the pressers 63a and 63b of the punch 59.

The punch 59 is lowered to form load bends 23a and 23b in the legs 21a and 21b along the edges 57a and 57b, which define bend lines 25a and 25b of the load bends 23a and 23b.

The bend line 25a on the recess 55 side is positionally shifted toward the base 3 from the bend line 25b on the surface 53 side due to the elastic deformation of the leg 21a. Accordingly, a positional difference D1 between the bend lines 25a and 25b is dependent on the depth D3 of the recess 55 of the die 51, i.e., a vertical interval or level difference between the edges 57a and 57b. The depth D3 of the recess 55 is determined according to the positional difference D1 between the bend lines 25a and 25b. According to the alternative embodiment, the depth D3 is about 10 to 30 μm.

Characteristics of head suspensions manufactured according to the present invention will be explained.

Figure 10:
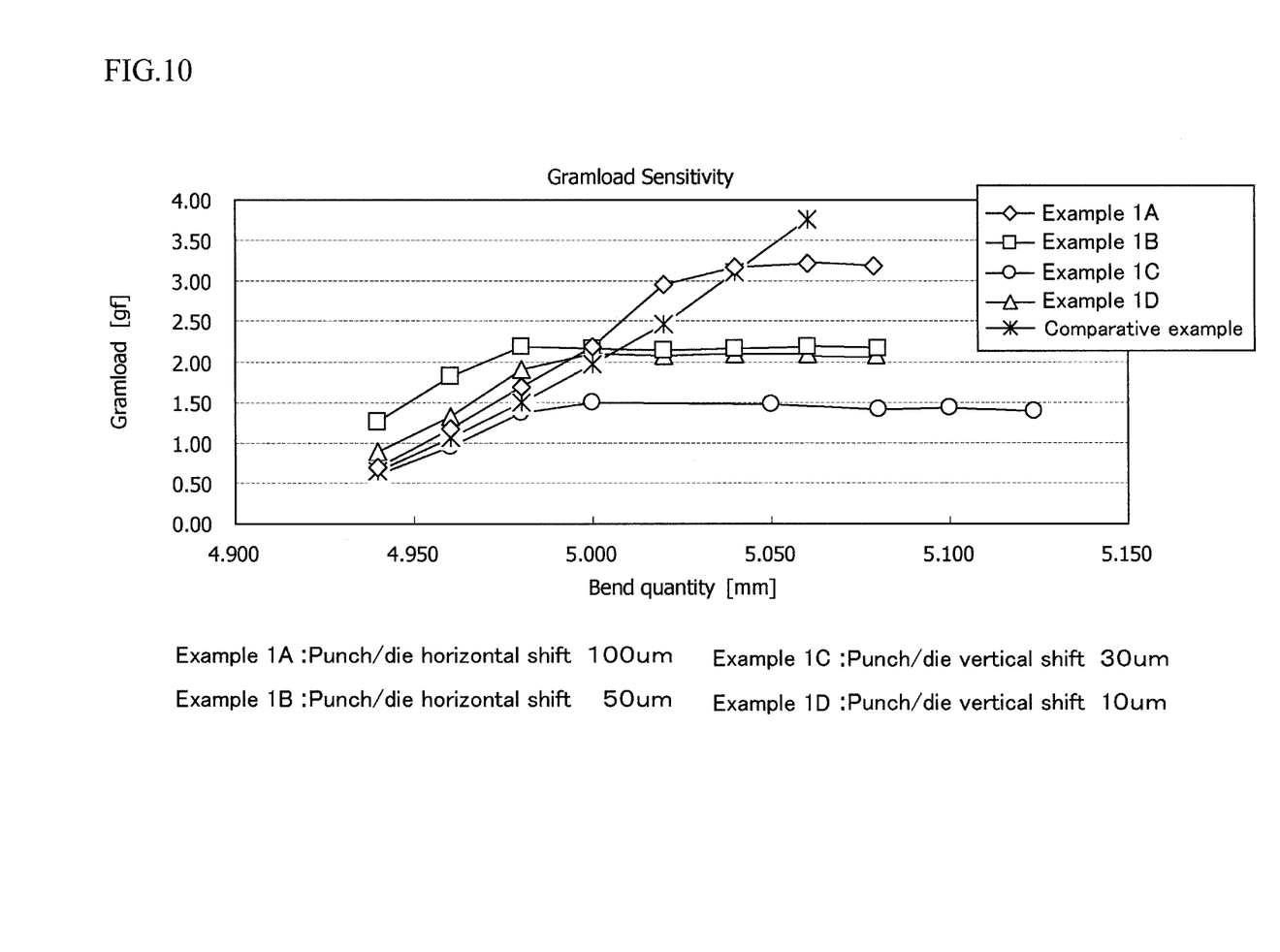
FIG. 10 is a graph illustrating relationships between bend quantity and gram load for different load bend distances.

FIG. 10 is a graph illustrating relationships between bend quantity and gram load of head suspensions having different load bends. In FIG. 10, an ordinate represents gram load (suspension preload) and an abscissa represents bend quantity.

Examples 1A to 1D in FIG. 10 are head suspensions produced according to the first embodiment or the alternative embodiment of the present invention each having the resilient part 19 that is provided with the load bends 23a and 23b whose bend lines 25a and 25b are positionally shifted from each other in the length direction of the load beam 5.

The head suspensions of Examples 1A and 1B are of the first embodiment of the present invention. The positional difference D2 between the edges 39a and 39b of the die 33, i.e., a punch/die horizontal shift is 100 μm in Example 1A and 50 μm in Example 1B. The head suspensions of Examples 1C and 1D are of the alternative embodiment. The depth D3 of the recess 55 of the die 51, i.e., a punch/die vertical shift is 30 μm in Example 1C and 10 μm in Example 1D.

The head suspension of Comparative Example in FIG. 10 has a standard resilient part that includes load bends whose bend lines are on the same straight line extending in the width direction of the load beam 5.

According to each of Examples 1A to 1D of the present invention, the gram load linearly increases as the bend quantity of the load bends 23a and 23b increases up to a predetermined quantity that is dependent on the positional shift D1 between the bend lines 25a and 25b of the load bends 23a and 23b. Once the bend quantity exceeds the predetermined quantity, the gram load of each of Examples 1A to 1D substantially becomes constant.

From this, it is understood that the head suspension 1 according to the present invention easily realizes a target gram load (target suspension preload) if the load bends 23a and 23b of the resilient part 19 are formed to have a predetermined bend quantity, which is dependent on the positional difference D1 between the bend lines 25a and 25b of the load bends 23a and 23b, or over.

On the other hand, the head suspension of Comparative Example of FIG. 10 linearly increases the gram load according to an increase in the bend quantity of the load bends. Accordingly, Comparative Example must strictly manage the bend quantity of the load bends to attain a target gram load value.

Figure 11:
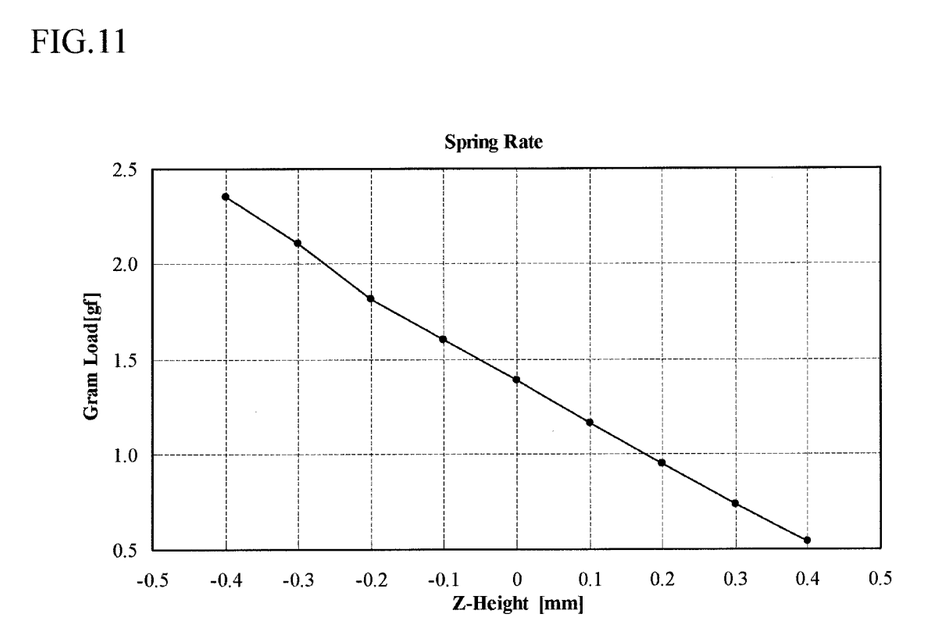
FIG. 11 is a graph illustrating a load characteristic of the head suspension according to the first embodiment and the alternative embodiment.

FIG. 11 is a graph illustrating a load characteristic of the head suspension 1 according to the first embodiment or alternative embodiment. In FIG. 11, an ordinate represents gram load (suspension preload) and an abscissa represents Z-height, i.e., an attaching position of the head suspension 1.

As is apparent in FIG. 11, the head suspension 1 having the positionally shifted bend lines 25a and 25b according to the first embodiment of the present invention demonstrates a linear spring constant like a head suspension having a standard resilient part.

An off-track characteristic, or a TMR (track misregistration) preventing ability of the head suspension 1 according to the present invention will be explained.

Figure 12A:
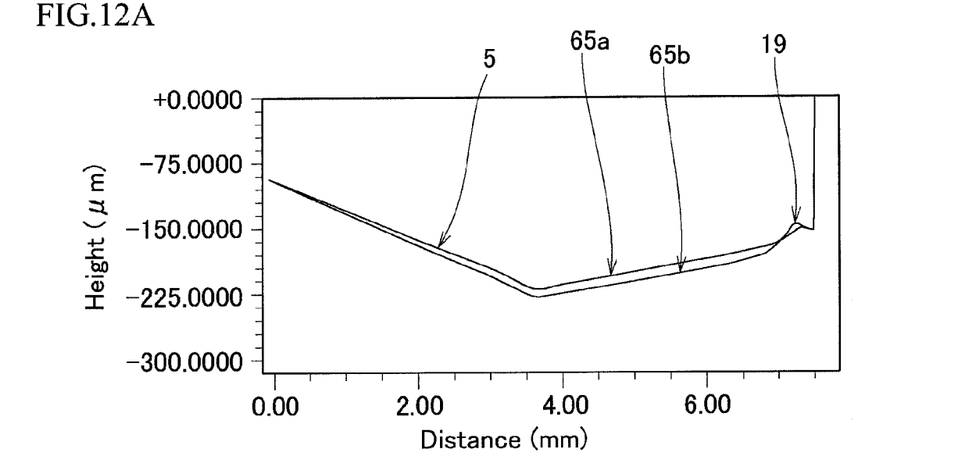
FIGS. 12A and 12B are diagrams illustrating height differences between longitudinal sides of the load beams according to the first embodiment and the alternative embodiment.
Figure 12B:
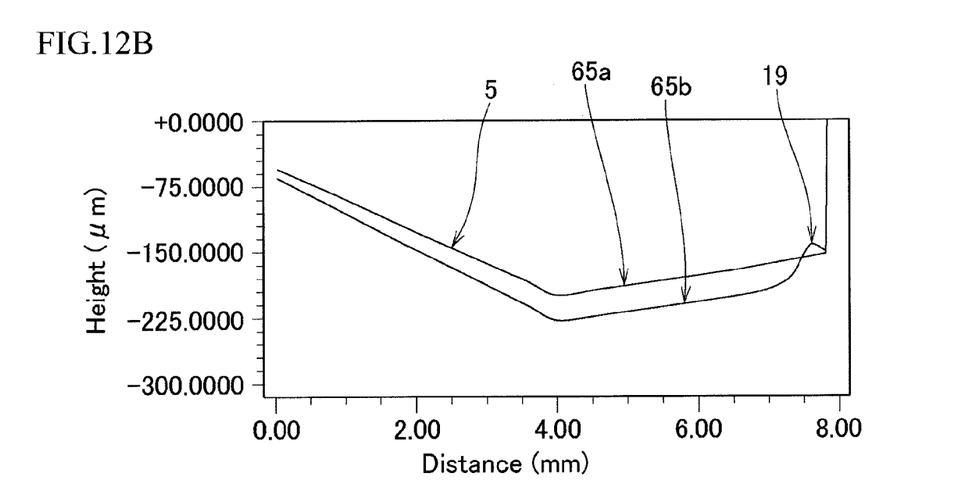

FIGS. 12A and 12B are diagrams illustrating height differences between opposite sides of the load beams 5 of the head suspensions 1 according to the first embodiment and the alternative embodiment of the present invention, respectively. In FIGS. 12A and 12B, an ordinate represents height and an abscissa represents longitudinal length. Lines 65a and 65b are contours of the load beam 5. A left end of the contour lines 65a and 65b corresponds to the head side of the head suspension 1, a lowest central part thereof corresponds to an intermediate part of the rigid part 17, and a rising right end thereof corresponds to the resilient part 19.

As illustrated in FIGS. 12A and 12B, the head suspension 1 according to each of the first embodiment and the alternative embodiment causes a height difference between the opposing longitudinal sides of the head suspension 1 due to the positional shift between the bend lines 25a and 25b of the load bends 23a and 23b of the resilient part 19. As a result, the head suspension 1 is inclined when attached to a carriage arm. This is effective to prevent TMR and improve the positioning performance of a transducer (head) of the head suspension against disk fluttering.

The height difference between the opposing longitudinal sides of the head suspension 1 is large in the alternative embodiment of FIG. 12B compared with that of the first embodiment of FIG. 12A. Selectively employing the first embodiment and the alternative embodiment will be effective to provide a head suspension having a proper inclination for preventing TMR.

Effect of the present invention will be explained.

The load beam 5 of the head suspension 1 of the first embodiment or the alternative embodiment according to the present invention has the resilient part 19 that includes the legs 21a and 21b that extend from widthwise sides of a base end of the rigid part 17. The load bends 23a and 23b are formed in the legs 21a and 21b along the bend lines 25a and 25b extending in the width direction of the load beam 5. The bend lines 25a and 25b are positionally shifted from each other in the length direction of the load beam 5.

The load bends 23a and 23b are bent to a predetermined bend quantity or over so that the load beam 5 generates a substantially constant gram load (suspension preload), the predetermined bend quantity being dependent on the positional difference between the bend lines 25a and 25b.

If the load bends 23a and 23b have the predetermined bend quantity, which is dependent on the positional difference between the bend lines 25a and 25b, or over, the load beam 5 easily and surely provides a target gram load value.

As a result, the present invention eliminates the strict management of the bend quantity of the resilient part 19, lightens the management of metal molds for forming the load bends 23a and 23b, and improves the productivity of the head suspension.

Even with the bend lines 25a and 25b positionally shifted from each other in the length direction of the load beam 5, the load beam 5 for the head suspension 1 demonstrates linearity with a given spring constant like the load beam having a standard resilient part.

Due to the bend lines 25a and 25b positionally shifted from each other, the load beam 5 has a level difference between the opposing longitudinal sides thereof. The level difference stabilizes a head positioning operation against disk flattering.

Accordingly, the head suspension 1 employing the load beam 5 according to the present invention also demonstrates the above-mentioned effects.

The method of forming a load bend according to the first embodiment or the alternative embodiment sets the resilient part 19 of the load beam 5 having unbent legs 21a and 21b on the die 33 (51) having the linear edges 39a and 39b (57a and 57b), brings the edges 39a and 39b (57a and 57b), which are positionally shifted from each other in the length direction of the load beam 5, into contact with the unbent legs 21a and 21b of the resilient part 19, and bends the unbent legs 21a and 21b along the edges 39a and 39b (57a and 57b) toward the die 33 (51), thereby forming the load bends 23a and 23b in the legs 21a and 21b.

The method easily and surely forms, in the legs 21a and 21b, the load bends 23a and 23b having the bend lines 25a and 25b that are positionally shifted from each other in the length direction of the load beam 5.

The die 33 has the extensions 37a and 37b that have different lengths and are provided with the edges 39a and 39b. The extensions 37a and 37b surely form the load bends 23a and 23b whose bend lines 25a and 25b are positionally shifted from each other in the length direction of the load beam 5 on the basis of different lengths of the extensions 37a and 37b. The lengths of the extensions 37a and 37b may optionally be set to adjust the positional difference between the bend lines 25a and 25b of the resilient part 19.

The modified die 33A of FIG. 5 has the recess 22 in the setting surface 20 on which the load beam 5 is set. The surface 20 with the recess 22 defines the edges 39Aa and 39Ab of the die 33A that are positionally shifted from each other in the length direction of the load beam 5 on the surface 20 of the die 33A by the recess 22.

The length of the recess 22 of the die 33A may optionally be set to adjust the positional difference between the bend lines 25a and 25b of the resilient part 19.

The die 51 according to the alternative embodiment has the recess 55 in the surface 53 on which the load beam 5 is set. The surface 53 and recess 55 of the die 51 define the edges 57a and 57b to surely form the load bends 23a and 23b whose bend lines 25a and 25b are positionally shifted from each other in the length direction of the load beam 5, the positional difference between the bend lines 25a and 25b being dependent on the depth D3 of the recess 55. Namely, the positional difference between the bend lines 25a and 25b of the resilient part 19 is easily adjustable by choosing the depth D3 of the recess 55.

The adjacent portions 49a and 49b on the load beam 5 relative to portions corresponding to the edges 57a and 57b of the die 51 are pressed toward the die 51, to bend the unbent legs 21a and 21b of the resilient part 19. More precisely, the adjacent portion 49a is first pressed to elastically deform the unbent leg 21a, and thereafter, the adjacent portion 49b is pressed as well as the adjacent portion 49a to permanently bend the unbent legs 21a and 21b.

As a result, timing to form the load bend 23a is closer to timing to form the load bend 23b, to reduce a bend quantity difference between the load bends 23a and 23b. Namely, the load bends 23a and 23b are both sufficiently bent to a predetermined bend quantity or over.

When the leg 21a comes in contact with the edge 57a, the adjacent portion 49b is pressed, so that the adjacent portions 49a and 49b are bent in synchronization, to surely reduce a bend quantity difference between the load bends 23a and 23b.

At this time, the short presser 63*b* and long presser 63*a* of the punch 59 are simultaneously moved toward the die 51 to press the adjacent portions 49*a* and 49*b* of the load beam 5. This shortens a manufacturing time or takt time of the head suspension 1.

What is claimed is:

1. A load beam for a head suspension, comprising:
a rigid part supporting a head at a front end thereof; and
a resilient part through which the rigid part is supported with a base to be attached to a carriage arm, to apply a load onto the head, wherein
the resilient part includes a pair of legs that extend from widthwise sides of a base end of the rigid part and load bends formed in the pair of legs, respectively,
each load bend is formed by bending a corresponding one of the legs along a bend line that is defined on the corresponding one of the legs and extends in a width direction of the load beam, and
the bend lines on the legs are positionally shifted from each other in a length direction of the load beam.

2. A head suspension including the load beam of claim 1, comprising:
a base that is attached to a carriage arm and supports the rigid part through the resilient part of the load beam; and
a flexure that is attached to the load beam and supports the head.

3. A method of forming the load bends of the load beam of claim 1, comprising steps of:
setting the resilient part of the load beam having a pair of unbent legs of the resilient part on a die having a pair of linear edges;
bringing the pair of linear edges in contact with the pair of unbent legs of the resilient part so that the pair of linear edges widthwise cross the pair of unbent legs at locations that are shifted from each other in the length direction of the load beam; and
bending the pair of unbent legs along the pair of edges of the die toward the die, thereby forming the load bends.

4. The method of claim 3, wherein the die has a pair of extensions having different lengths and the pair of edges of the die are edges of the pair of extensions.

5. The method of claim 3, wherein the die has a recess in a setting surface on which the resilient part of the load beam is set and the pair of edges of the die are edges that are defined on the setting surface and are positionally shifted from each other in the length direction of the load beam by the recess.

6. The method of claim 3, wherein the die has a recess in a setting surface on which the resilient part of the load beam is set, and the pair of edges of the die are a surface edge defined by the setting surface and a recess edge defined by the recess and are shifted from each other in a direction in which the pair of legs are bent.

7. The method of claim 6, wherein the bending step is carried out by pressing a portion of the load beam adjacent to a portion of the load beam corresponding to the recess edge toward the die to elastically deform the unbent leg on the recess, and thereafter, pressing a portion of the load beam adjacent to a portion of the load beam corresponding to the surface edge toward the die.

8. The method of claim 7, wherein the bending step is carried out by simultaneously moving a recess presser and surface presser toward the die, the recess presser being longer than the surface presser and pressing the portion adjacent to the portion corresponding to the recess edge, the surface presser pressing the portion adjacent to the portion corresponding to the surface edge.

* * * * *